Patented Aug. 8, 1950

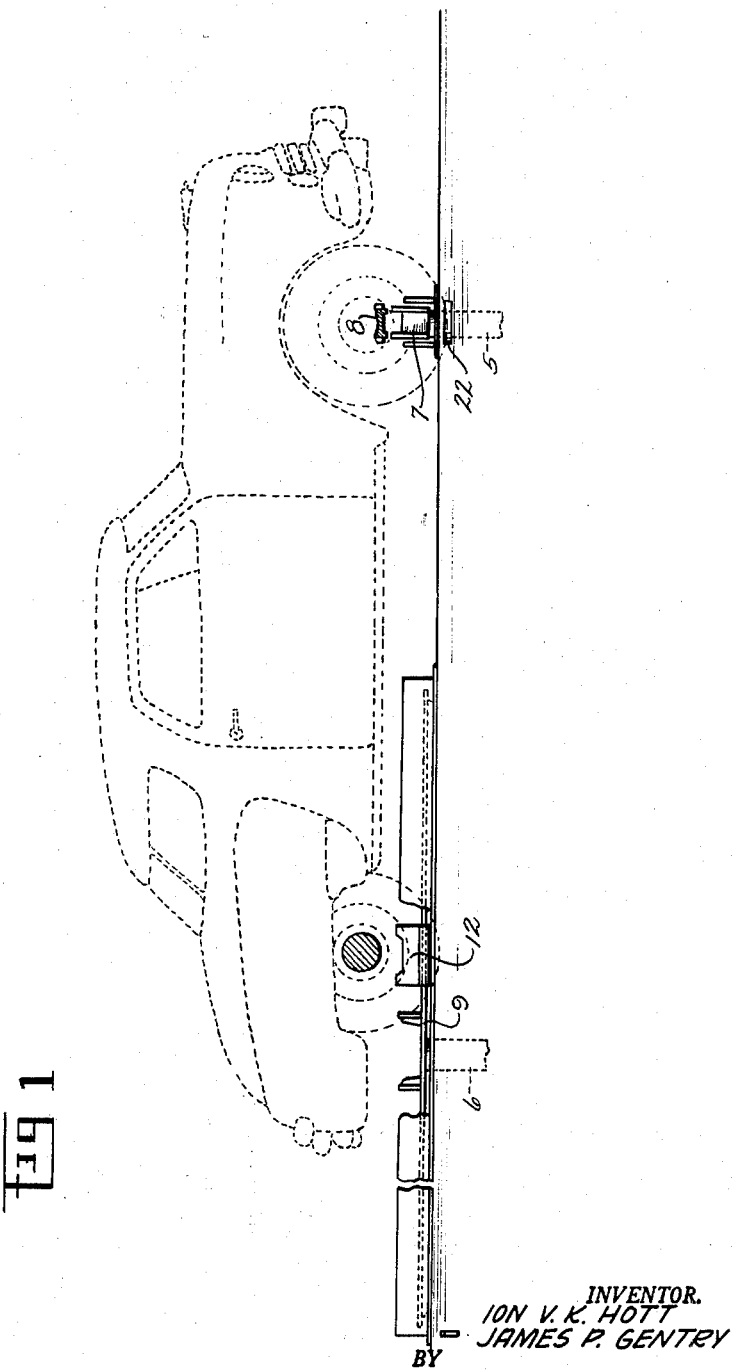

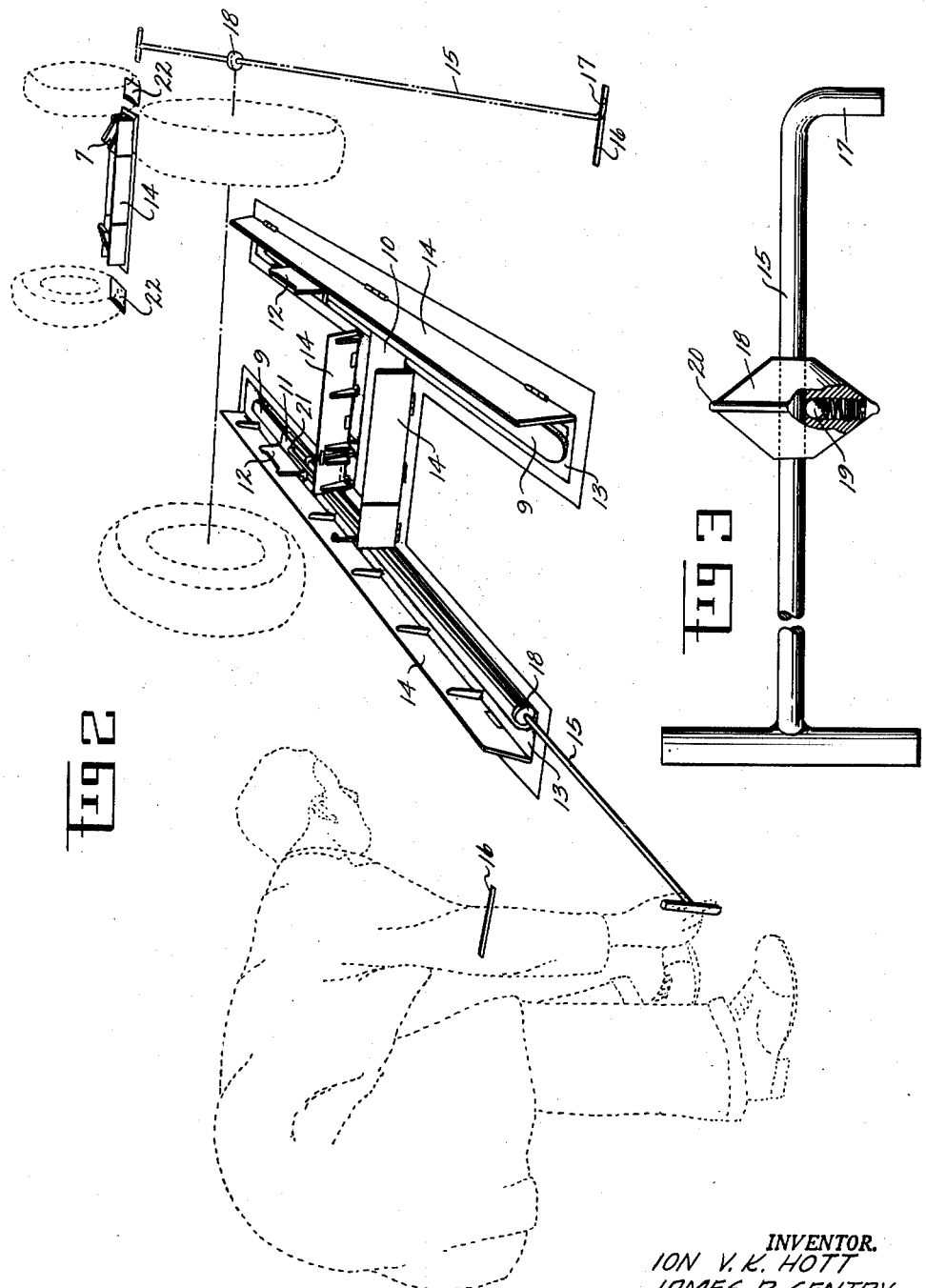

2,517,789

UNITED STATES PATENT OFFICE 2,517,789

METHOD AND APPARATUS FOR ADJUSTING AXLE ENGAGING MEMBERS OF AUTOMOBILE LIFTS

Ion V. K. Hott and James P. Gentry, Dayton, Ohio, assignors to The Joyce-Cridland Company, Dayton, Ohio, a corporation of Ohio Application February 10, 1947, Serial No. 727,482

9 Claims. (Cl. 254—89)

This invention relates to a method and apparatus for adjusting the axle engaging members on the superstructure of an automobile lift, and is designed primarily for use with the rear superstructure of a two-post lift, but is not limited to such use.

The usual two-post lift comprises separate lifting mechanisms for the front and rear axles of the automobile, each lifting mechanism comprising a vertically movable lifting element, such as the ram of a hydraulic mechanism, on which is mounted a superstructure having means for engaging and supporting the corresponding axle. The front superstructure may be, and usually is, a rigid member extending lengthwise of the front axle and having direct contact therewith. An automobile to be serviced is positioned with its axles above the respective superstructure and the front axle is accurately positioned above the front superstructure regardless of the length of the automobile, this being usually accomplished by locating the front wheels at the respective ends of that superstructure.

To accommodate the lift to automobiles of different lengths the rear superstructure extends lengthwise of the automobile and is of substantial length. Usually it comprises laterally spaced parallel rails. Axle engaging members, or supports, are mounted on the respective rails for adjustment lengthwise thereof and must be accurately positioned below the rear axle after the front axle has been positioned above the front superstructure. The rear end of the automobile body extends rearwardly a substantial distance beyond the rear axle and the body and wheels so restrict the access to and the visibility of the axle engaging members from the sides of the superstructure that they must be adjusted from the rear end of the automobile. It is exceedingly difficult for an operator at the rear end of the automobile to determine the exact positions of the axle engaging members with relation to the axle, and as a result they do not always properly engage the axle when the superstructure is moved upwardly.

One object of the invention is to provide a method whereby the axle engaging members may be easily and accurately adjusted, and an apparatus for performing the method.

A further object of the invention is to provide such a method, the performance of which requires a minimum of operations.

A further object of the invention is to provide a device by which the distance between the rear axle and the rear end of the superstructure may be accurately measured and the device then used to adjust the axle engaging members according to said measurement.

Other objects of the invention may appear as it is described in detail.

In the accompanying drawings Figure 1 is a side elevation, partly broken away, showing a two-post automobile lift and the relation of the axles to the axle supports on the superstructures; Figure 2 is a perspective view illustrating the apparatus and the performance of the method; and Figure 3 is a side elevation, partly broken away, of the measuring and actuating device.

In these drawings we have illustrated a preferred embodiment of the invention and have shown the same in association with a two-post lift of a known type, but it is to be understood that both the apparatus and the method may take various forms and may be used with lifts of various kinds, without departing from the spirit of the invention.

The lift here shown comprises front and rear lifting mechanisms each including a ram, 5 and 6, on which are mounted the respective superstructures. The front superstructure 7 extends lengthwise of the front axle 8 and is of narrow width and adapted to move directly into supporting engagement with the front axle. The rear superstructure, which is carried by the ram 6, extends for substantial distances both forwardly and rearwardly from the ram and has mounted thereon an axle engaging device which is adjustable to accommodate the same to automobiles of different lengths, that is, in which the front and rear axle are spaced apart different distances. In the arrangement shown this superstructure comprises a pair of parallel rails 9 supported by a cross head 10 which in turn is supported on the ram 6. The axle engaging device comprises two elements separately movable on the respective rails and each comprising a base 11 slidably mounted on the corresponding rail and an axle engaging part 12. The lift here illustrated is of the type in which the lifting mechanisms are mounted below the floor on which the automobile rests, the floor being provided with openings 13 through which the superstructures and rams may move to engage the axles and elevate the vehicle. The openings are normally closed by doors 14 which are opened to permit the passage of the superstructures. The means for actuating the doors forms no part of this invention and need not be described or illustrated. However, it will be noted that both lifting mechanisms have been actuated to move the superstructures to positions at or slightly above the floor level at which point they are stopped to permit the adjustment of the axle engaging elements.

Suitable means are provided for measuring the distance between the rear axle and the rear end of the superstructure, in the present instance the rear ends of the rails 9, and this same means is utilized for adjusting the axle engaging elements. In the form shown this means comprises an elongate actuating member, preferably a rod 15 of a length not less than the length of the rear superstructure. To measure the distance between the axle and the rear end of the superstructure this actuating member, or rod, is placed lengthwise of the automobile at one side of the superstructure with its rear end located at a point substantially in the vertical plane of the rear ends of the rails 9. Usually a mark is placed on the floor in transverse alignment with the ends of the rails to facilitate the accurate positioning of the rod and preferably this mark is in the nature of a recess 16 formed in the floor and adapted to receive the downturned end 17 of the actuating rod 15 and to thus positively position the rear end of the rod. The forward portion of the rod extends through the vertical plane of the rear axle and the point on the rod at which it intersects that vertical plane is indicated, as by positioning on the rod a suitable indicator which will be yieldably retained in the position to which it has been moved. In the preferred construction, as shown in Figure 3, an indicator 18 is slidably mounted on the rod 15 and is provided with a spring pressed friction device 19 to resist its movement from its adjusted position. The opposite ends of this indicator are in the form of opposed frustums of cones which provide at 20 a relatively sharp edge which can be accurately positioned with relation to the axle or to its vertical plane.

After the measurement has been made, as indicated by the indicator 18, the actuating rod is turned end for end and inserted beneath the rear end of the automobile above one of the rails with that end which was placed on the mark foremost. When the rod is provided with the downturned end 17 the base of the axle engaging element may be provided with a socket to receive said end as shown at 21. When the end of the rod is first connected with the axle engaging element that element may be either in the front of or in the rear of the axle but, in either event, the rod and axle are moved longitudinally to locate the indicator 18 in the vertical plane of the rear end of the superstructure. Thus the axle engaging element is spaced from the rear end of its rail the same distance that the axle is spaced from the rear end of that rail and is therefore directly below the axle. The two axle engaging elements are successively adjusted in this manner so that they are in transverse alignment one with the other.

When the automobile to be serviced is placed above the lift the front axle is accurately positioned above the front superstructure 7 and to facilitate this positioning thereof marks are arranged at the respective sides of the superstructure to indicate the positions in which the wheels should stand, these marks preferably being in the nature of shallow recesses 22 to receive the lower portions of the respective wheels. When the front axle has been so located the distance between the rear axle and the rear end of the rear superstructure is measured on the measuring rod, as above described, and that rod is then reversed and connected successively with the axle engaging elements and actuated to adjust said elements to positions determined by the measurement indicated on the rod.

While we have shown and described our method and the means for performing the same, we wish it to be understood that we do not desire to be limited to the details thereof as various modifications may occur to a person skilled in the art.

Having now fully described our invention, what we claim as new and desire to secure by Letters Patent is:

1. The method of adjusting an axle engaging device lengthwise of a superstructure of an automobile lift, which comprises measuring on an elongate member the distance from an axle of an automobile supported above said superstructure to the rear end of said superstructure and indicating said distance on one end portion of said elongate member, inserting the measured portion of said elongate member beneath the end portion of said automobile, engaging said elongate member with said axle engaging device and moving said elongate member and said device lengthwise of said superstructure to locate the indication on said elongate member at the rear end of said superstructure.

2. A method of adjusting axle engaging devices lengthwise of the rails of the rear axle supporting superstructure of an automobile lift, which comprises positioning an elongate member lengthwise of said superstructure with one end thereof substantially in a line transverse to and close to the rear ends of said rails and with the other end thereof extending forwardly beyond the rear axle of an automobile supported above said lift, indicating on said member while in said position the distance from said line to the vertical plane of said rear axle, inserting the first mentioned end of said member beneath the rear portion of said automobile and lengthwise of said rails, engaging said first mentioned end of said member with the axle engaging device on one of said rails and moving said member and said device lengthwise of said rails until the indication on said member is substantially in said transverse line, thereby locating said axle engaging device directly below said rear axle.

3. The method of utilizing the actuating member of an axle engaging device on the superstructure of an automobile lift to predetermine the required location of said axle engaging device with relation to said superstructure and for positioning the same in that location, which comprises positioning said actuating member lengthwise of said superstructure with one end thereof substantially in the vertical plane of the rear end of said superstructure and with the other end thereof extending forwardly through the vertical plane of the rear axle of an automobile supported above said lift, indicating on said member while it is so positioned the distance between said planes, turning said member end for end, positioning the same above and lengthwise of said superstructure with the first mentioned end thereof foremost, engaging said first mentioned end of said member with said axle engaging device and moving said member and said device lengthwise of said superstructure to locate said indication on said member substantially in said vertical plane of the rear end of said superstructure.

4. In combination with an automobile lift comprising a front axle supporting structure, a rear axle supporting structure including parallel rails and axle engaging elements movable lengthwise of the respective rails, a mark spaced laterally from said rear superstructure and in line with the rear ends of said rails, an elongate actuating member adapted to have one end thereof placed on said mark and to extend forwardly beyond an axle supported above said rear superstructure, means for indicating on said actuating member the distance between said axle and the rear ends of said rails, said actuating member having at the first mentioned end thereof a part to engage one of said axle engaging elements, whereby said first mentioned end of said actuating member may be inserted beneath the rear portion of said automobile, engaged with the axle engaging element of one of said rails and moved lengthwise to locate said indicating means at the rear end of said rail and thus position said element directly below said axle.

5. In combination with an automobile lift comprising a front superstructure, a rear superstructure including parallel rails and axle engaging elements movable lengthwise of the respective rails, a recess in the floor spaced laterally from said rear superstructure and in alinement with the rear ends of said rails, an elongate actuating member adapted to be positioned lengthwise of said rear superstructure with its front end extending forwardly beyond the rear axle of an automobile supported above said rear superstructure, said actuating member having at its rear end a part to enter said recess, an indicator adjustable on said actuating member to indicate the distance between said axle and the rear ends of said rails, said part at the rear end of said actuating member being adapted to engage one of said axle engaging elements when said actuating member is reversed and positioned lengthwise of the rail on which said element is supported, whereby the movement of said actuating member to locate said indicator at the rear end of said rail will accurately position said element with relation to said rear axle.

6. A device for adjusting an axle engaging element on the superstructure of an automobile lift to accurately position the same with relation to an axle supported above said superstructure, said device comprising an elongate member having adjacent one end thereof a part to engage and actuate said axle engaging element, said member being adapted to be positioned lengthwise of said superstructure with said part thereof substantially in the vertical plane of the rear end of said superstructure and with the other end thereof extending forwardly through the vertical axial plane of said axle, and means to indicate on said member while in said position the distance between said planes, said part of said member being adapted to operatively engage said axle engaging element when said member is turned end for end and positioned lengthwise of said superstructure so that the movement of said member lengthwise of said superstructure to position said indication at the rear end of said superstructure will locate said axle engaging device beneath said axle.

7. A device for adjusting an axle engaging element on the superstructure of an automobile lift to accurately position the same with relation to an axle supported above said superstructure, said device comprising an elongate member having adjacent one end thereof a part to engage and actuate said axle engaging element, said member being adapted to be positioned lengthwise of said superstructure between the vertical plane of the rear end of said superstructure and the vertical axial plane of said axle with said part thereof substantially in one of said planes and with the other end portion thereof extending through the other of said planes, and means to indicate on said member while in said position the distance between said planes, said part of said member being adapted to operatively engage said axle engaging element when said member is positioned lengthwise of said superstructure with said part foremost and to move said axle engaging element to a position beneath said axle when said member is moved lengthwise to locate said indication thereon at the rear end of said superstructure.

8. A device for adjusting an axle engaging element on the superstructure of an automobile lift to accurately position the same with relation to an axle supported above said superstructure, said device comprising a rod adapted to extend lengthwise of said superstructure with its rear end substantially in transverse alignment with the rear end of said superstructure and with its forward end beyond said axle, an indicator to be positioned on said rod substantially in the vertical plane of said axle, said rear end of said rod being adapted to engage and actuate said axle engaging element when said rod is turned end for end and placed lengthwise of said superstructure.

9. A device for adjusting an axle engaging element on the superstructure of an automobile lift to accurately position the same with relation to an axle supported above said superstructure, said device comprising a rod of a length at least as great as the length of said superstructure, an indicator adjustable on said rod to measure the distance between said axle and the rear end of said superstructure, said rod having at that end of the measured portion thereof which is remote from said indicator a part adapted to engage and actuate said axle engaging element.

ION V. K. HOTT.
JAMES P. GENTRY.

REFERENCES CITED

The following references are of record in the file of this patent:

UNITED STATES PATENTS

| Number | Name | Date |
| --- | --- | --- |
| 1,990,242 | Mizer | Feb. 5, 1935 |
| 2,424,673 | Thompson | July 29, 1947 |

FOREIGN PATENTS

| Number | Country | Date |
| --- | --- | --- |
| 22,422 | Great Britain | of 1893 |